(12) United States Patent
Zhang et al.

(10) Patent No.: US 10,510,253 B2
(45) Date of Patent: Dec. 17, 2019

(54) METHOD AND APPARATUS FOR INDICATING VEHICLE MOVING STATE

(71) Applicant: Baidu Online Network Technology (Beijing) Co., Ltd., Beijing (CN)

(72) Inventors: Tianlei Zhang, Beijing (CN); Wenli Yang, Beijing (CN); Zhenguang Zhu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 63 days.

(21) Appl. No.: 15/385,571

(22) Filed: Dec. 20, 2016

(65) Prior Publication Data
US 2018/0018875 A1   Jan. 18, 2018

(30) Foreign Application Priority Data
Jul. 12, 2016   (CN) .......................... 2016 1 0548306

(51) Int. Cl.
| | | |
|---|---|---|
| *B60Q 1/34* | (2006.01) | |
| *G08G 1/16* | (2006.01) | |
| *B60Q 5/00* | (2006.01) | |
| *B60R 11/04* | (2006.01) | |
| *G01S 19/42* | (2010.01) | |

(52) U.S. Cl.
CPC .............. *G08G 1/163* (2013.01); *B60Q 1/34* (2013.01); *B60Q 5/005* (2013.01); *G08G 1/165* (2013.01); *G08G 1/166* (2013.01); *G08G 1/167* (2013.01); *B60Q 2400/50* (2013.01); *B60R 11/04* (2013.01); *G01S 19/42* (2013.01)

(58) Field of Classification Search
CPC ......... B60W 30/08; B60W 30/09; B60Q 1/26; G08G 1/16; G08G 1/165; G08G 1/166
See application file for complete search history.

(56) References Cited

U.S. PATENT DOCUMENTS

| | | | |
|---|---|---|---|
| 9,969,326 B2 * | 5/2018 | Ross ........................ | B60Q 1/50 |
| 2014/0214260 A1 * | 7/2014 | Eckert ................... | B60Q 1/488 |
| | | | 701/28 |
| 2015/0336502 A1 * | 11/2015 | Hillis ....................... | B60Q 1/26 |
| | | | 701/23 |

(Continued)

FOREIGN PATENT DOCUMENTS

| | | |
|---|---|---|
| CN | 201872661 U | 6/2011 |
| CN | 103223976 A | 7/2013 |

(Continued)

*Primary Examiner* — Anshul Sood
(74) *Attorney, Agent, or Firm* — Knobbe Martens Olson & Bear LLP (57) ABSTRACT

The present disclosure discloses embodiments of methods and apparatuses for indicating a vehicle moving state. In some embodiments, a method includes receiving a vehicle driving instruction; detecting a driving environment outside the vehicle; determining a driving strategy for executing the vehicle driving instruction in the driving environment; determining a driving track instructed by the driving strategy; and projecting the driving track on a road when the driving environment satisfies a preset condition. This implementation can clearly indicate the position that a vehicle is about to occupy, thereby improving the effect of interaction between the vehicle and other vehicles or pedestrians.

13 Claims, 6 Drawing Sheets

(56) References Cited

U.S. PATENT DOCUMENTS

2015/0348388 A1\* 12/2015 Teller ................. G06K 9/00671
           340/937
2016/0207443 A1\* 7/2016 Widdowson ......... B60Q 1/0011
2017/0120908 A1\* 5/2017 Oniwa .................. B60W 10/20
2017/0361763 A1\* 12/2017 Webb ....................... B60Q 1/28

FOREIGN PATENT DOCUMENTS

| CN | 103335658 A | 10/2013 |
| CN | 104842860 A | 8/2015 |

\* cited by examiner

METHOD AND APPARATUS FOR INDICATING VEHICLE MOVING STATE

CROSS REFERENCE TO RELATED DISCLOSURE

This disclosure claims priority to Chinese Patent Disclosure No. 201610548306.X, entitled "Method And Apparatus For Indicating Vehicle Moving State" and filed on Jul. 12, 2016, which is incorporated herein by reference in its entirety.

TECHNICAL FIELD

The present disclosure relates to the field of Internet technology, specifically to the field of vehicle control, and more specifically to a method and apparatus for indicating a vehicle moving state.

BACKGROUND

Good interaction between a vehicle and other road users (e.g., other moving vehicles or pedestrians) can not only clearly convey the moving intension of the vehicle, but also improve the safety of the road users. This is particularly important for a driverless vehicle to clearly express the intention of the driverless vehicle during moving, and can also increase the general acceptance of the driverless vehicle to people.

The existing methods of interaction mainly display a next action of the vehicle by providing light emitting diode (LED) indicators in the front and at the back of the vehicle, or use a warning sound towards passengers or moving vehicles when the vehicle is turning or is about to stop at a station. However, the above-mentioned warning method cannot clearly indicate the position that will be occupied by the vehicle, resulting in an unsatisfactory interaction between the vehicle and the other vehicles or pedestrians.

SUMMARY

An objective of some embodiments of the present disclosure is to provide a method and apparatus for indicating a vehicle moving state, so as to solve the technical problems mentioned in the Background section.

According to a first aspect, the present disclosure provides a method for indicating a vehicle moving state, the method comprising: receiving a vehicle driving instruction; detecting a driving environment outside the vehicle; determining a driving strategy for executing the vehicle driving instruction in the driving environment; determining a driving track instructed by the driving strategy; and projecting the driving track on a road when the driving environment satisfies a preset condition.

In some embodiments, the detecting a driving environment outside the vehicle comprises: detecting a current position of the vehicle, information about a road the vehicle being on, and a position of an obstacle outside the vehicle by using a detecting apparatus disposed on the vehicle.

In some embodiments, the determining the driving strategy for executing the vehicle driving instruction in the driving environment comprises: determining a target position to be reached by executing the vehicle driving instruction; and determining a vehicle driving distance and a vehicle turning angle required for avoiding the obstacle during driving from the current position to the target position, based on the current position, the position of the obstacle, and the target position.

In some embodiments, the determining the driving track instructed by the driving strategy comprises: determining the driving track of the vehicle, based on the current position, the vehicle driving distance, the vehicle turning angle, and the target position.

In some embodiments, the projecting the driving track on the road when the driving environment satisfies the preset condition comprises: determining an arrow identifier corresponding to the vehicle driving instruction from a preset arrow identifier list; extracting a keyword from the vehicle driving instruction; and projecting the driving track, the arrow identifier corresponding to the vehicle driving instruction, and the extracted keyword on the road when the driving environment satisfies the preset condition.

In some embodiments, the projecting the driving track on the road when the driving environment satisfies the preset condition comprises: projecting the driving track on the road when the detected driving environment comprises a driving vehicle or a pedestrian or the vehicle locates in a residential area.

In some embodiments, the method further comprises: extracting sound information corresponding to the vehicle driving instruction from a preset sound database; and playing the sound information corresponding to the vehicle driving instruction during when executing the vehicle driving instruction.

In some embodiments, the method further comprises: projecting warning information in front of and/or behind the vehicle by a preset distance when the vehicle fails.

In some embodiments, the projecting the driving track on the road comprises: projecting the driving track on the road by using a light projecting device mounted at a preset position on the vehicle.

According to a second aspect, the present disclosure provides an apparatus for indicating a vehicle moving state, wherein the apparatus comprises: a receiving unit for receiving a vehicle driving instruction; a detecting unit for detecting a driving environment outside the vehicle; a strategy determining unit for determining a driving strategy for executing the vehicle driving instruction in the driving environment; a track determining unit for determining a driving track instructed by the driving strategy; and a projecting unit for projecting the driving track on a road when the driving environment satisfies a preset condition.

In some embodiments, the detecting unit is further configured to: detect a current position of the vehicle, information about a road the vehicle being located on, and a position of an obstacle outside the vehicle by using a detection apparatus disposed on the vehicle.

In some embodiments, the strategy determining unit comprises: a first determining module for determining a target position to be reached by executing the vehicle driving instruction; and a second determining module for determining a vehicle driving distance and a vehicle turning angle required for avoiding the obstacle during driving from the current position to the target position, based on the current position, the position of the obstacle, and the target position.

In some embodiments, the track determining unit is further configured to: determine the driving track of the vehicle, based on the current position, the vehicle driving distance, the vehicle turning angle, and the target position.

In some embodiments, the projecting unit comprises: an arrow determining module for determining an arrow identifier corresponding to the vehicle driving instruction from a preset arrow identifier list; a keyword extracting module for extracting a keyword of the vehicle driving instruction; and a projecting module for projecting the driving track, the arrow identifier corresponding to the vehicle driving instruction, and the extracted keyword on the road, when the driving environment satisfies the preset condition.

In some embodiments, the projecting unit is further configured to: project the driving track on the road when the detected driving environment comprises a driving vehicle or a pedestrian or the vehicle locates in a residential area.

In some embodiments, the apparatus further comprises: a sound extraction unit for extracting sound information corresponding to the vehicle driving instruction from a preset sound database; and a playing unit for playing the sound information corresponding to the vehicle driving instruction during executing the vehicle driving instruction.

In some embodiments, the apparatus further comprises: a failure warning unit for projecting warning information in front of and/or behind the vehicle by a preset distance when the vehicle fails.

In some embodiments, the projecting unit is further configured to: project the driving track on the road by using a light projecting device mounted at a preset position on the vehicle.

According to the method and apparatus for indicating a vehicle moving state that are provided by the present disclosure, after a vehicle driving instruction is received, a driving environment outside the vehicle is detected; a driving strategy for executing the above-mentioned vehicle driving instruction in the above-mentioned driving environment is determined; and a driving track instructed by the above-mentioned driving strategy is projected on a road when the driving environment satisfies a requirement. Therefore, the position that the vehicle is about to occupy can be clearly indicated, thereby improving the effect of interaction between the vehicle and other vehicles or pedestrians.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
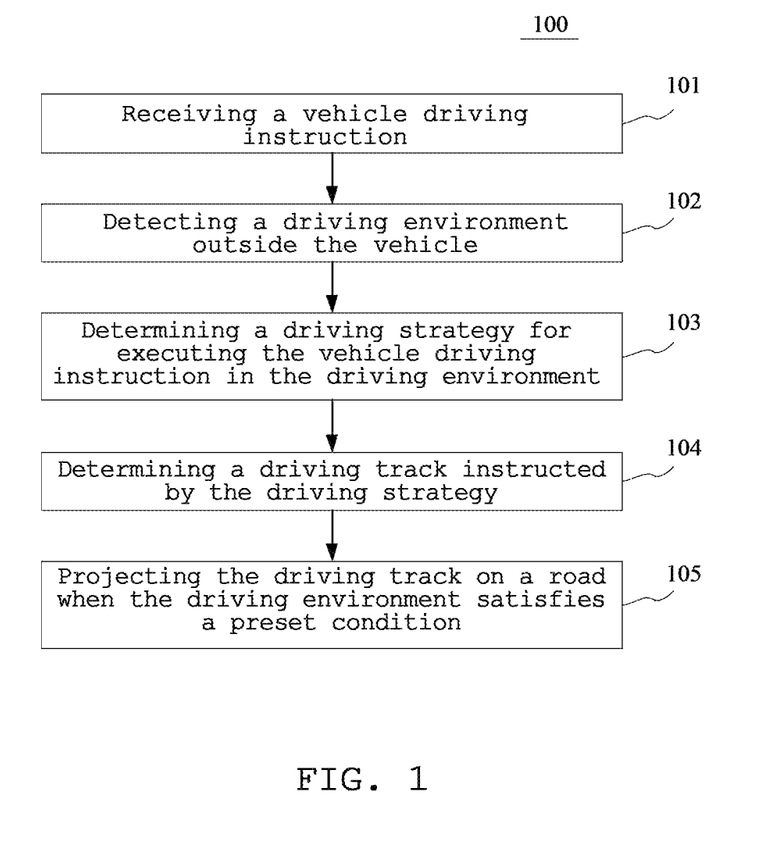
FIG. 1 is a flow chart of a method for indicating a vehicle moving state according to some embodiments of the present disclosure.

FIG. 1 shows a flow 100 of a method for indicating a vehicle moving state according to some embodiments of the present disclosure. As shown in FIG. 1, the method for indicating a vehicle moving state according to some embodiments includes the following steps:

Step 101. Receiving a vehicle driving instruction.

In some embodiments, the vehicle may be a driverless vehicle, or an existing vehicle that needs to be driven by a driver. The vehicle driving instruction may be a start instruction, a lane changing instruction, a turning instruction, a stop instruction, a reversing instruction, or any other instruction for changing the current driving state of the vehicle.

The vehicle may receive the vehicle driving instruction when the driver turns on the steering light or shifts the gear shift lever, or may receive the vehicle driving instruction in other approaches that can implement the above-mentioned instruction. For example, when the driver shifts the gear shift lever of the vehicle to the reverse gear, the vehicle receives a reversing instruction.

Alternatively, the vehicle may receive the vehicle driving instruction from a server by interacting with the server. It should be appreciated that the server may send the vehicle driving instruction to the vehicle according to requirements.

Step 102. Detecting a driving environment outside the vehicle.

In some embodiments, the vehicle may detect the driving environment outside the vehicle by using a camera or radar detection apparatus mounted on the vehicle, and may detect the current position of the vehicle by using a Global Positioning System (GPS) positioning apparatus. The driving environment may include an environment the vehicle being located on, information about a road the vehicle being located on (for example, intersection information, the width of the road, and the position of a median strip on the road), obstacles around the vehicle, and so on.

Step 103. Determining a driving strategy for executing the above-mentioned vehicle driving instruction in the above-mentioned driving environment.

In some embodiments, when the vehicle is in a complex environment, the vehicle may need to adjust the position or angle of the vehicle when executing the above-mentioned vehicle driving instruction. In addition, there may be multiple modes of executing the above-mentioned vehicle driving instruction, and one of the modes needs to be selected. In some embodiments, the above-mentioned method for adjusting the position or angle of the vehicle so as to execute the above-mentioned vehicle driving instruction is defined as a driving strategy. It should be appreciated that the above-mentioned driving strategy is closely related to the driving environment of the vehicle.

Step 104. Determining a driving track instructed by the above-mentioned driving strategy.

After the driving strategy for executing the above-mentioned vehicle driving instruction is determined, a distance or angle by which the vehicle needs to be adjusted and the target position specified by the above-mentioned vehicle driving instruction can be determined based on the above-mentioned driving strategy, so that the driving track instructed by the above-mentioned driving strategy can be determined.

Step 105. Projecting the above-mentioned driving track on a road when the above-mentioned driving environment satisfies a preset condition.

In some embodiments, when the vehicle needs to interact with other vehicles or pedestrians, the vehicle projects the above-mentioned driving track on the road, so that the other vehicles or pedestrians can clearly learn the next action of the vehicle.

In some optional implementations of some embodiments, the above-mentioned light projecting device may be mounted at the headlight, the rear position light, and the front/rear door handle of the vehicle, so as to accurately project the above-mentioned driving track.

Figure 2:
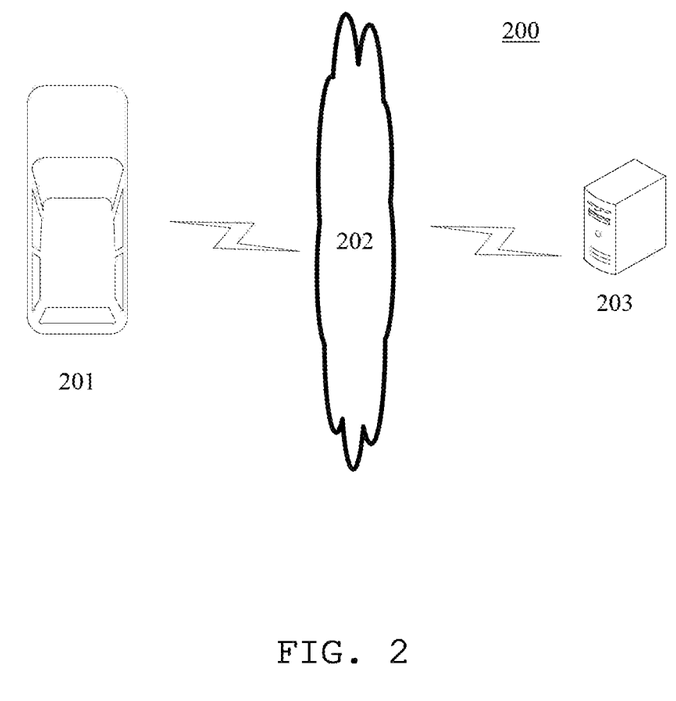
FIG. 2 is a diagram illustrating an exemplary system architecture to which the present disclosure can be applied.

In some embodiments, when the vehicle needs to receive the vehicle driving instruction from a server, a diagram of a corresponding system architecture is as shown in FIG. 2. In FIG. 2, the system architecture 200 may include a vehicle 201, a network 202, and a server 203. The network 202 is a medium for providing a communication link between the vehicle 201 and the server 203. The network 202 may include various connection types, such as wired and wireless communication links or optical fiber cables.

The vehicle 201 may include an apparatus such as a radar or camera that can detect the external driving environment, and may further include a light projecting device (for example, a laser imaging light or projector light) that can project the driving track of the vehicle on the road. The light projecting device may project light of different colors to adapt to different driving environments, so that the vehicles and pedestrians around the vehicle can clearly notice the driving track of the vehicle. For example, red light is projected on the road at night; green light is projected in the daytime.

The server 203 may be a server for providing various services, for example, a back-end server for controlling the driving state of the vehicle 201. The back-end server may deliver the vehicle driving instruction to the vehicle 201, and may also learn in real time the position information of the vehicle 201, so as to accurately control the vehicle moving state.

It should be noted that the method for indicating a vehicle moving state provided in some embodiments of the present disclosure is generally executed by the vehicle 201. Correspondingly, the apparatus for indicating the vehicle moving state is generally disposed in the vehicle 201.

It should be appreciated that the number of vehicles, the number of networks, and the number of servers in FIG. 2 are merely exemplary. Any number of vehicles, networks, and servers may be set according to implementation requirements.

According to the method for indicating a vehicle moving state that is provided in the above-mentioned embodiments of the present disclosure, after a vehicle driving instruction is received, a driving environment outside the vehicle is detected; a driving strategy for executing the above-mentioned vehicle driving instruction in the above-mentioned driving environment is determined; and a driving track instructed by the above-mentioned driving strategy is projected on a road when the driving environment satisfies a requirement. Therefore, the position that the vehicle is about to occupy can be clearly indicated, thereby improving the effect of interaction between the vehicle and other vehicles or pedestrians.

Figure 3:
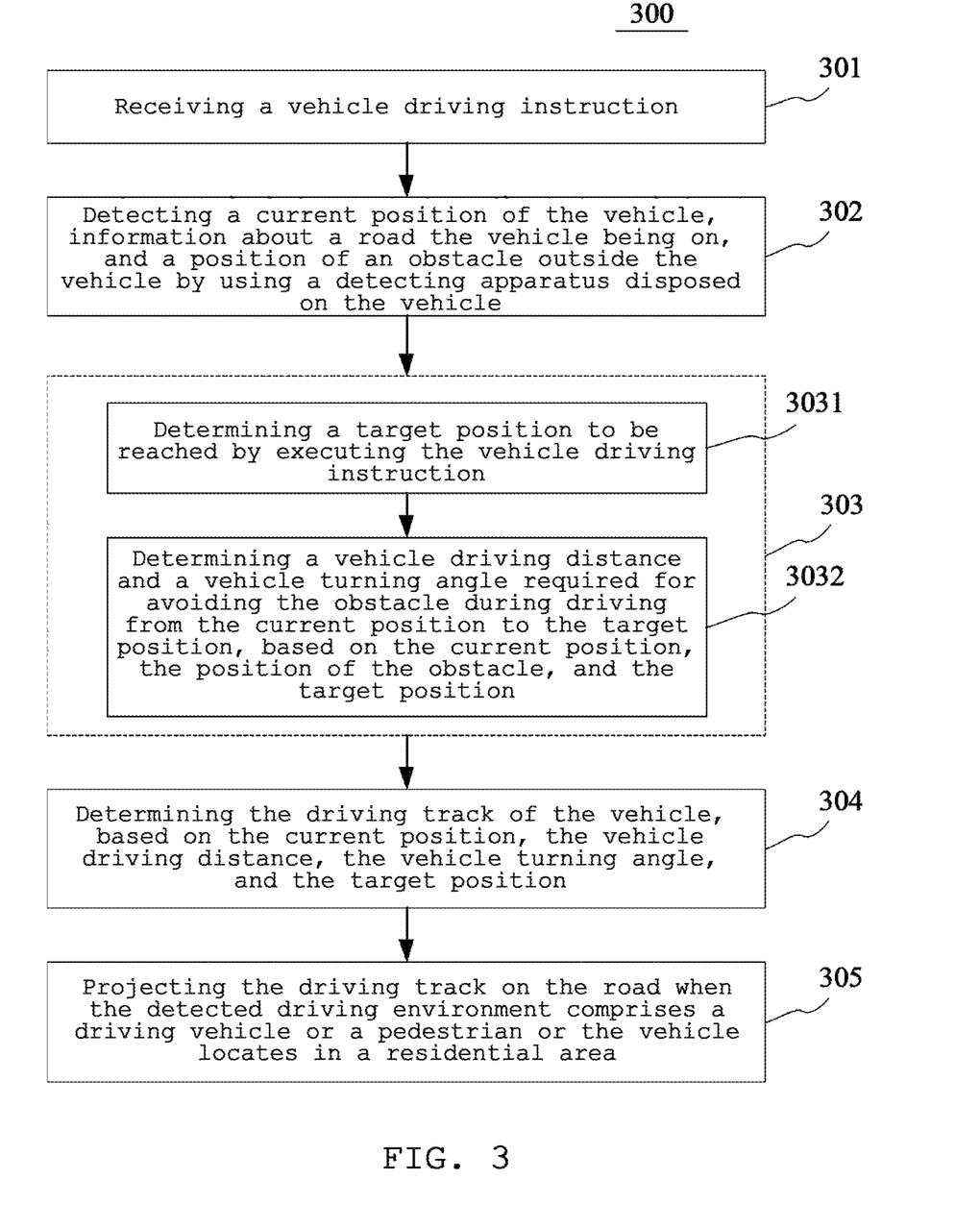
FIG. 3 is a flow chart of a method for indicating a vehicle moving state according to some embodiments of the present disclosure.

Further, referring to FIG. 3, FIG. 3 shows a flow 300 of a method for indicating a vehicle moving state according to some embodiments of the present disclosure. As shown in FIG. 3, the method for indicating a vehicle moving state according to some embodiments includes the following steps:

Step 301. Receiving a vehicle driving instruction.

Step 302. Detecting a current position of the vehicle, information about a road the vehicle being located on, and a position of an obstacle outside the vehicle by using a detection apparatus disposed on the vehicle.

In some embodiments, the current position of the vehicle may be current longitude and latitude information of the vehicle, or may be street information of an area where the vehicle is currently located, or any other information that can clearly indicate the position of the vehicle. The information about the road where the vehicle is located may include intersection information of the road (for example, cross intersection, T intersection, or Y intersection), the width of the road, speed limit information of the road, and so on. The obstacle outside the vehicle may be a roadblock, a plant, a road shoulder, a vehicle, a pedestrian, and so on. The position of the obstacle may be longitude and latitude information of the obstacle, or may be information about the relative position with respect to the current vehicle.

Step 303 is specifically implemented through two sub-steps 3031 and 3032.

Sub-step 3031. Determining a target position to be reached by executing the vehicle driving instruction.

After receiving the vehicle driving instruction, the vehicle determines the target position to be reached by executing the above-mentioned vehicle driving instruction. For example, when receiving a turning instruction, the vehicle determines, based on the information about the road where the vehicle is located, the target position on the road after turning.

Sub-step 3032. Determining a vehicle driving distance and a vehicle turning angle required for avoiding the obstacle during driving from the current position to the target position, based on the current position, the position of the obstacle, and the target position.

After determining the current position of the vehicle, the position of the obstacle in the driving environment, and the target position to be reached by executing the above-mentioned vehicle driving instruction, the vehicle may determine the vehicle driving distance and the vehicle turning angle required for avoiding the obstacle in the process of driving from the current position to the target position. It should be appreciated that the above-mentioned vehicle driving distance may be a distance forward or rearward in parallel with the vehicle body, and the vehicle turning angle may range from 0 to a maximum turning angle of wheels.

Step 304. Determining a driving track of the vehicle based on the current position, the vehicle driving distance, the vehicle turning angle, and the target position.

The driving track of the vehicle may be depicted based on the current position of the vehicle, the target position of the vehicle, and the vehicle driving distance and the vehicle turning angle that are required in the process of driving from the current position to the target position.

Step 305. Projecting the driving track on the road when the detected driving environment comprises a driving vehicle or a pedestrian or the vehicle locates in a residential area.

In some embodiments, when there is no object needing to interact with the vehicle around the vehicle, the vehicle does not need to project the driving track on the road. When there are other driving vehicles or pedestrians in the driving environment, the vehicle needs to interact with these road users, and therefore needs to project the driving track on the road. When the vehicle enters a residential area, for example, is driving in a residential community, pedestrians may appear at any time, and therefore the vehicle needs to project in real time the driving track on the road, so that the pedestrians inside the residential community can avoid the vehicle.

In some optional implementations of some embodiments, to more clearly indicate the vehicle moving state, the projecting the driving track on the road may be implemented through the following steps:

first, determining an arrow identifier corresponding to the vehicle driving instruction in a preset arrow identifier list; extracting a keyword from the vehicle driving instruction; and projecting the driving track, the arrow identifier corresponding to the vehicle driving instruction, and the extracted keyword on the road.

For example, if the turning instruction received by the vehicle is a turn right instruction, the corresponding arrow identifier is an arrow that bends to the right, and the corresponding keyword is "turn right". In this case, a shadow projected on the road further includes the above-mentioned arrow that bends to the right and the two words "turn right", in addition to the driving track. It should be appreciated that the above-mentioned driving track, the arrow identifier, and the keyword may be presented in different colors on the road, so that other road users can more intuitively learn the vehicle moving state.

In some optional implementations of some embodiments, the above-mentioned method further includes the following step not shown in FIG. 3:

extracting sound information corresponding to the vehicle driving instruction from a preset sound database; and playing the sound information corresponding to the vehicle driving instruction when executing the vehicle driving instruction.

In some embodiments, to avoid the unfriendliness of the existing warning sounds, sounds in the natural world may be used as warning sounds. For example, the sound of running water, twitter of birds, or other sounds that can arouse notice of other road users may be used. In some embodiments, different sound information may be set for different driving instructions of the vehicle, so that people can learn the vehicle moving state upon hearing the above-mentioned sound information.

In some optional implementations of some embodiments, the above-mentioned method further includes the following step not shown in FIG. 3:

projecting warning information in front of and/or behind the vehicle by a preset distance when the vehicle fails.

In some embodiments, when the vehicle fails, not only the double flash is turned on, but also warning information is projected to a position at a preset distance in front of and/or behind the vehicle by using a light projecting device mounted on the vehicle. For example, in the prior art, when a vehicle fails on an expressway, a passenger on the vehicle needs to get off the vehicle and set a warning sign at 150 meters behind the vehicle, posing danger to the passenger who needs to set the warning sign. In this case, a warning sign may be projected at 150 meters behind the vehicle by using the light projecting device, to warn other vehicles that the vehicle fails.

Figure 4:
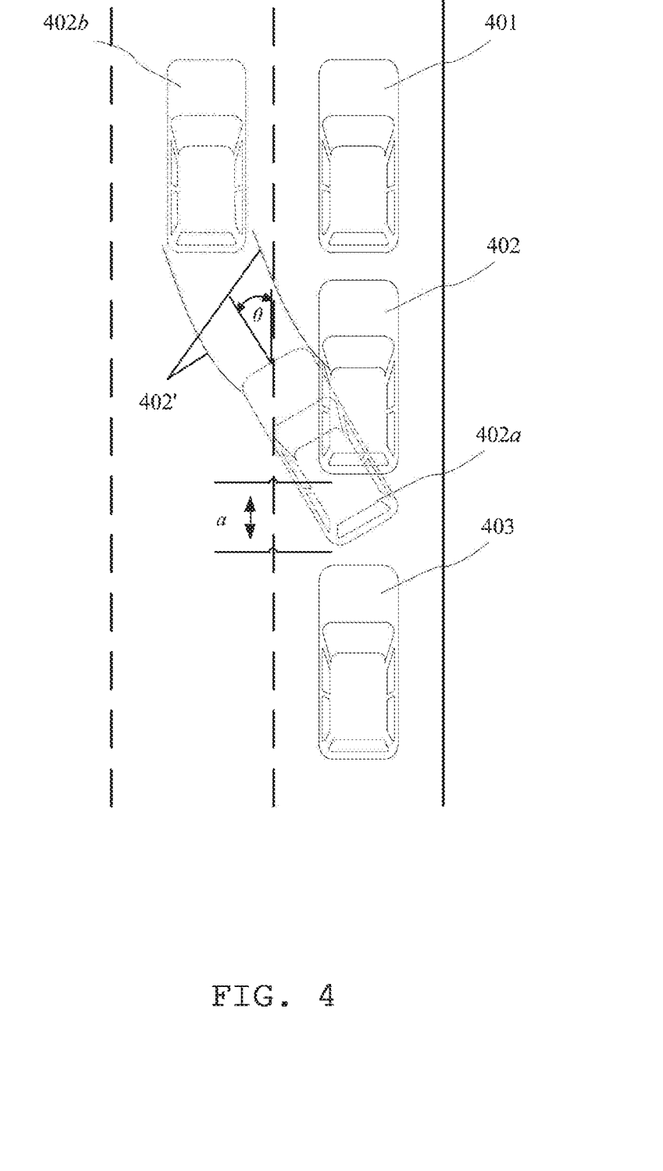
FIG. 4 is a schematic diagram of an disclosure scenario of a method for indicating a vehicle moving state according to some embodiments of the present disclosure.

Further, referring to FIG. 4, FIG. 4 is a schematic diagram of an disclosure scenario of a method for indicating a vehicle moving state according to some embodiments. In the scenario of FIG. 4, vehicles 401, 402, 403 are all parking on the road side, the vehicle 402 being closer to the vehicle 401. After receiving a start instruction, the vehicle 402 determines that a driving strategy for executing the above-mentioned start instruction in this driving environment is driving back by a distance of a and turning the vehicle anticlockwise by an angle of θ. In this case, the position of the vehicle 402 on the road is the position of a dashed-line vehicle shown by 402a. The target position specified by the above-mentioned start instruction is the position of a dashed-line vehicle shown by 402b. The corresponding driving track of the vehicle 402 from the position shown by 402a to the position shown by 402b is as shown by 402'. Because there are the vehicle 401 and the vehicle 403 around the vehicle 402, the vehicle 402 projects the above-mentioned driving track on the road.

According to the method for indicating a vehicle moving state provided in the above-mentioned embodiments of the present disclosure, the arrow identifier and the keyword corresponding to the vehicle driving instruction are projected on the road, allowing interaction objects of the vehicle to clearly learn the vehicle moving state; sound information corresponding to the vehicle driving instruction is played, and sounds in the natural world are used as the sound information, thereby reducing noise pollution; when the vehicle fails, a warning sign is projected to a position at a preset distance on the road, thereby improving safety of passengers.

Figure 5:
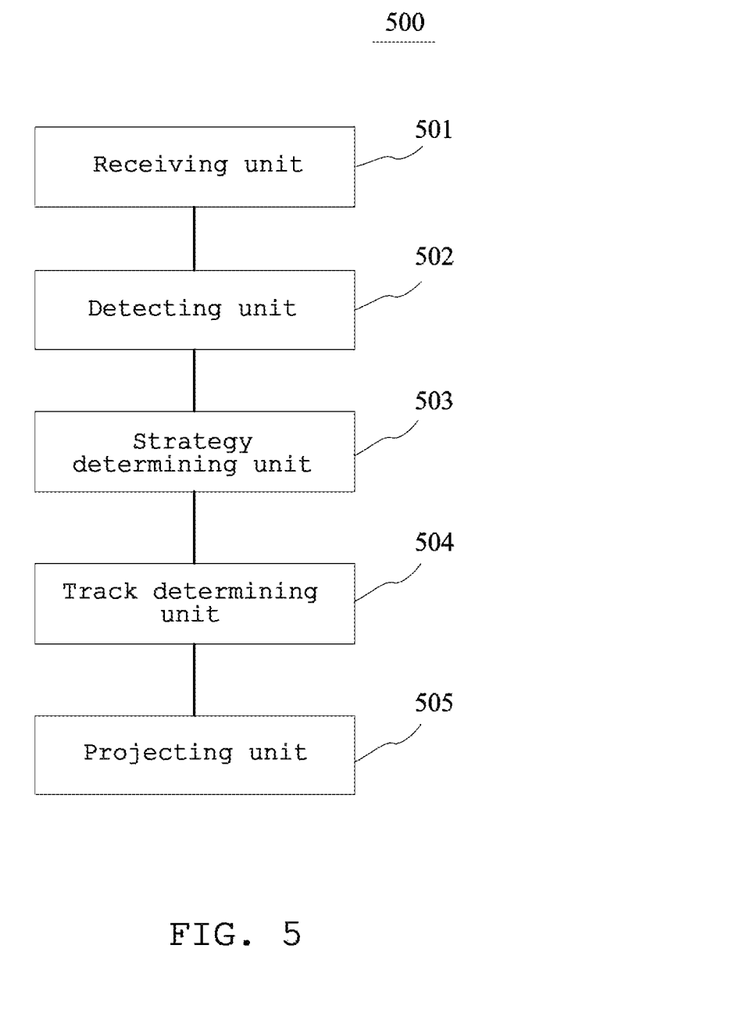
FIG. 5 is a schematic structural diagram of an apparatus for indicating a vehicle moving state according to some embodiments of the present disclosure.

Further, referring to FIG. 5, as an implementation of the methods shown in the above-mentioned figures, the present disclosure provides some embodiments of an apparatus for indicating a vehicle moving state. This apparatus embodiment corresponds to a method embodiment shown in FIG. 1. The apparatus may be specifically applied to an on-board computer of a vehicle.

As shown in FIG. 5, the apparatus 500 for indicating a vehicle moving state according to some embodiments includes: a receiving unit 501, a detecting unit 502, a strategy determining unit 503, a track determining unit 504, and a projecting unit 505.

The receiving unit 501 is used for receiving a vehicle driving instruction.

In some embodiments, the receiving unit 501 may receive the vehicle driving instruction from a server that is communicatively connected to the apparatus 500 for indicating a vehicle moving state, or may receive the vehicle driving instruction from a driver in the vehicle.

The detecting unit 502 is used for detecting a driving environment outside the vehicle.

In some embodiments, the detecting unit 502 may detect the driving environment outside the vehicle by using a radar detection device or a camera mounted on the vehicle.

In some optional implementations of some embodiments, the detecting unit 502 is further used for:

detecting a current position of the vehicle, information about a road the vehicle being located on, and a position of an obstacle outside the vehicle by using a detection apparatus disposed on the vehicle.

In some embodiments, the current position of the vehicle may be current longitude and latitude information of the vehicle, or may be street information of an area where the vehicle is currently located, or any other information that can clearly indicate the position of the vehicle. The information about the road where the vehicle is located may include intersection information of the road (for example, cross intersection, T intersection, or Y intersection), the width of the road, speed limit information of the road, and so on. The obstacle outside the vehicle may be a roadblock, a plant, a road shoulder, a vehicle, a pedestrian, and so on. The position of the obstacle may be longitude and latitude information of the obstacle, or may be information about the relative position with respect to the current vehicle.

The strategy determining unit 503 is used for determining a driving strategy for executing the vehicle driving instruction in the driving environment.

When the vehicle is in a complex environment, the vehicle may need to adjust the position or angle of the vehicle when executing the above-mentioned vehicle driving instruction. In addition, there may be multiple modes of executing the above-mentioned vehicle driving instruction, and one of the modes needs to be selected.

In some optional implementations of some embodiments, the strategy determining unit 503 may further include a first determining module and a second determining module that are not shown in FIG. 5.

The first determining module is used for determining a target position to be reached by executing the vehicle driving instruction.

The second determining module is used for determining a vehicle driving distance and a vehicle turning angle that are required for avoiding the obstacle in the process of driving from the current position to the target position, based on the current position, the position of the obstacle, and the target position determined by the first determining module.

The track determining unit 504 is used for determining a driving track instructed by the driving strategy determined by the strategy determining unit 503.

After the driving strategy for executing the above-mentioned vehicle driving instruction is determined, a distance or angle by which the vehicle needs to be adjusted and the target position specified by the above-mentioned vehicle driving instruction can be determined based on the above-mentioned driving strategy, so that the driving track instructed by the above-mentioned driving strategy can be determined.

In some optional implementations of some embodiments, the track determining unit 504 may be further used for: determining a driving track of the vehicle based on the current position, the vehicle driving distance and the vehicle turning angle determined by the second determining module, and the target position determined by the first determining module.

The projecting unit 505 is used for projecting the driving track determined by the track determining unit 504 on a road when the driving environment detected by the detecting unit 502 satisfies a preset condition.

In some embodiments, when the vehicle needs to interact with other vehicles or pedestrians, the vehicle projects the above-mentioned driving track on the road, so that the other vehicles or pedestrians can clearly learn the next action of the vehicle.

In some optional implementations of some embodiments, the projecting unit 505 may further project the above-mentioned driving track by using a light projecting device mounted at the headlight, the rear position light, and the front/rear door handle of the vehicle.

In some optional implementations of some embodiments, the projecting unit 505 may be further used for: projecting the driving track on the road when the detected driving environment comprises a driving vehicle or a pedestrian or that the vehicle is located in a residential area.

In some optional implementations of some embodiments, the projecting unit 505 may further include an arrow determining module, a keyword extracting module, and a projecting module that are not shown in FIG. 5.

The arrow determining module is used for determining an arrow identifier corresponding to the vehicle driving instruction in a preset arrow identifier list.

The keyword extracting module is used for extracting a keyword of the vehicle driving instruction.

The projecting module is used for projecting the driving track, the arrow identifier corresponding to the vehicle driving instruction that is determined by the arrow determining module, and the keyword extracted by the keyword extracting module, on a road when the driving environment satisfies a preset condition.

In some optional implementations of some embodiments, the above-mentioned apparatus for indicating a vehicle moving state 500 may further include a failure warning unit, not shown in FIG. 5, for projecting warning information to a position at a preset distance in front of and/or behind the vehicle when the vehicle fails.

According to the apparatus for indicating a vehicle moving state that is provided the above-mentioned embodiments of in the present disclosure, after the receiving unit receives a vehicle driving instruction, the detecting unit detects a driving environment outside the vehicle; the strategy determining unit determines a driving strategy for executing the above-mentioned vehicle driving instruction in the above-mentioned driving environment; and when the above-mentioned driving environment satisfies a requirement, the projecting unit projects a driving track instructed by the above-mentioned driving strategy that is determined by the track determining unit on a road. Whereby, the position that the vehicle is about to occupy can be clearly indicated, thereby improving the effect of interaction between the vehicle and other vehicles or pedestrians.

Figure 6:
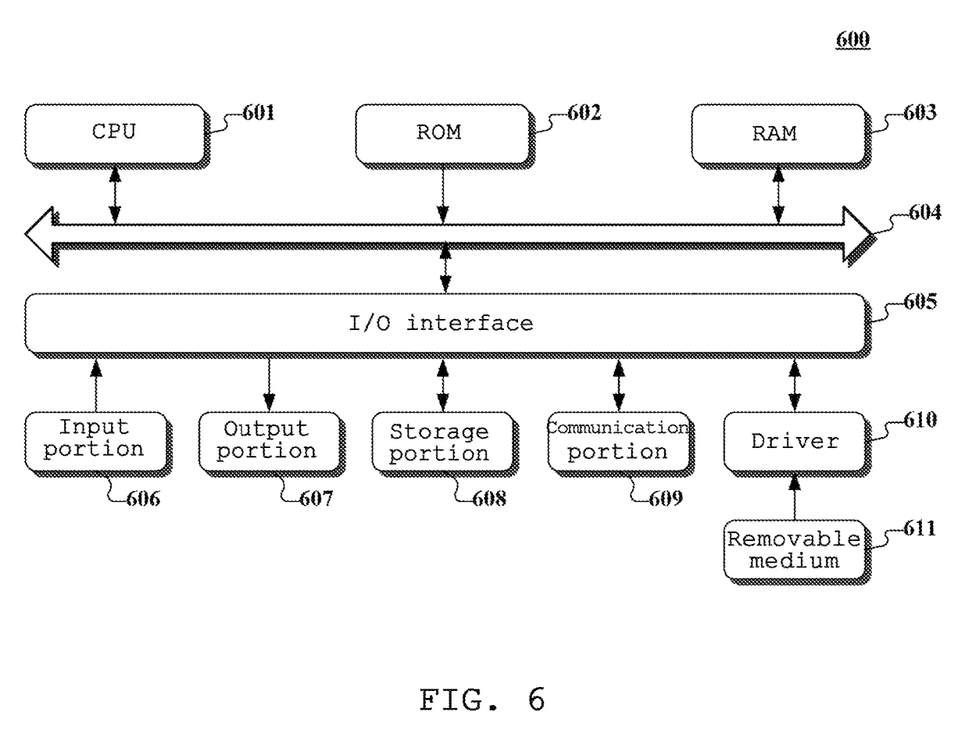
FIG. 6 is a schematic structural diagram of a computer system adapted to implement an apparatus for indicating a vehicle moving state according to some embodiments of the present disclosure.

Referring to FIG. 6, a schematic structural diagram of a computer system 600 adapted to implement a terminal apparatus or a server of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to some embodiments of the present disclosure, the process described above with reference to the flowcharts may be implemented in a computer software program. For example, some embodiments of the present disclosure include a computer program product, which comprises a computer program that is tangibly embedded in a machine-readable medium. The computer program comprises program codes for executing the method of the flowcharts. In such embodiments, the computer program may be downloaded and installed from a network via the communication portion 609, and/or may be installed from the removable media 611. The computer program is executed by the central processing unit (CPU) 601 to execute the above mentioned functions defined in the method of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor, for example, described as: a processor, comprising a receiving unit, a detecting unit, a strategy determining unit, a track determining unit and a projecting unit where the names of these modules are not considered as a limitation to the modules. For example, the receiving unit may also be described as "an unit for receiving a vehicle driving instruction".

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs are executed by one device so that the device receives a vehicle driving instruction; detects a driving environment outside the vehicle; determines a driving strategy for executing the vehicle driving instruction in the driving environment; determines a driving track instructed by the driving strategy; and projects the driving track on a road when the driving environment satisfies a preset condition.

The foregoing is only a description of some embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present disclosure with (but not limited to), technical features with similar functions.

Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain embodiments and disclosures, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for indicating a vehicle moving state, comprising:
    receiving a vehicle driving instruction;
    detecting a driving environment outside a vehicle;
    determining a driving strategy for executing the vehicle driving instruction in the driving environment;
    determining a driving track instructed by the driving strategy; and
    projecting the driving track on a road by using a light projecting device mounted at a headlight, a rear position light, or a front/rear door handle of the vehicle when the driving environment satisfies a preset condition, wherein the satisfying the preset condition comprises: the vehicle being located in a residential area;
    wherein the determining the driving strategy for executing the vehicle driving instruction in the driving environment comprises:
        determining a target position to be reached by executing the vehicle driving instruction; and
        determining a vehicle driving distance and a vehicle turning angle required for avoiding an obstacle outside the vehicle during driving from a current position of the vehicle to the target position, based on the current position, a position of the obstacle, and the target position.

2. The method according to claim 1, wherein the detecting the driving environment outside the vehicle comprises:
    detecting the current position of the vehicle, information about the road the vehicle being on, and the position of the obstacle outside the vehicle by using a detecting apparatus disposed on the vehicle.

3. The method according to claim 1, wherein the determining the driving track instructed by the driving strategy comprises:
    determining the driving track of the vehicle, based on the current position, the vehicle driving distance, the vehicle turning angle, and the target position.

4. The method according to claim 1, further comprising:
    extracting sound information corresponding to the vehicle driving instruction from a preset sound database; and
    playing the sound information corresponding to the vehicle driving instruction while executing the vehicle driving instruction.

5. The method according to claim 1, further comprising:
    projecting warning information in front of and/or behind the vehicle by a preset distance when the vehicle fails.

6. The method according to claim 1, wherein the projecting the driving track on the road when the driving environment satisfies the preset condition comprises:
    determining an arrow identifier corresponding to the vehicle driving instruction from a preset arrow identifier list;

extracting a keyword from the vehicle driving instruction; and projecting the driving track, the arrow identifier corresponding to the vehicle driving instruction, and the extracted keyword on the road when the driving environment satisfies the preset condition.

7. An apparatus for indicating a vehicle moving state, comprising:
at least one processor; and
a memory storing instructions, the instructions when executed by the at least one processor, cause the at least one processor to perform operations, the operations comprising:
receiving a vehicle driving instruction;
detecting a driving environment outside a vehicle;
determining a driving strategy for executing the vehicle driving instruction in the driving environment;
determining a driving track instructed by the driving strategy; and
projecting the driving track on a road by using a light projecting device mounted at a headlight, a rear position light, or a front/rear door handle of the vehicle when the driving environment satisfies a preset condition, wherein the satisfying the preset condition comprises the vehicle being located in a residential area;
wherein the determining the driving strategy for executing the vehicle driving instruction in the driving environment comprises:
determining a target position to be reached by executing the vehicle driving instruction; and
determining a vehicle driving distance and a vehicle turning angle required for avoiding an obstacle outside the vehicle during driving from a current position of the vehicle to the target position, based on the current position, a position of the obstacle, and the target position.

8. The apparatus according to claim 7, wherein the detecting the driving environment outside the vehicle comprises:
detecting the current position of the vehicle, information about the road the vehicle being located on, and the position of the obstacle outside the vehicle by using a detection apparatus disposed on the vehicle.

9. The apparatus according to claim 7, wherein the determining the driving track instructed by the driving strategy comprises:
determining the driving track of the vehicle, based on the current position, the vehicle driving distance, the vehicle turning angle, and the target position.

10. The apparatus according to claim 7, the operations further comprising:

extracting sound information corresponding to the vehicle driving instruction from a preset sound database; and
playing the sound information corresponding to the vehicle driving instruction while executing the vehicle driving instruction.

11. The apparatus according to claim 7, the operations further comprising:
projecting warning information in front of and/or behind the vehicle by a preset distance when the vehicle fails.

12. The apparatus according to claim 7, wherein the projecting the driving track on the road when the driving environment satisfies the preset condition comprises:
determining an arrow identifier corresponding to the vehicle driving instruction from a preset arrow identifier list;
extracting a keyword from the vehicle driving instruction; and
projecting the driving track, the arrow identifier corresponding to the vehicle driving instruction, and the extracted keyword on the road when the driving environment satisfies the preset condition.

13. A non-transitory computer storage medium storing a computer program, which when executed by one or more processors, causes the one or more processors to perform operations, the operations comprising:
receiving a vehicle driving instruction;
detecting a driving environment outside a vehicle;
determining a driving strategy for executing the vehicle driving instruction in the driving environment;
determining a driving track instructed by the driving strategy; and
projecting the driving track on a road by using a light projecting device mounted at a headlight, a rear position light, or a front/rear door handle of the vehicle when the driving environment satisfies a preset condition, wherein the satisfying the preset condition comprises the vehicle being located in a residential area;
wherein the determining the driving strategy for executing the vehicle driving instruction in the driving environment comprises:
determining a target position to be reached by executing the vehicle driving instruction; and
determining a vehicle driving distance and a vehicle turning angle required for avoiding an obstacle outside the vehicle during driving from a current position of the vehicle to the target position, based on the current position, a position of the obstacle, and the target position.

* * * * *